(12) United States Patent
Gorin et al.

(10) Patent No.: US 7,390,964 B2
(45) Date of Patent: *Jun. 24, 2008

(54) WALL PLATE HAVING INTERNAL NOSE FOR ELECTRICAL CABLE

(75) Inventors: Thomas Michael Gorin, Atlanta, GA (US); James Loye Hutchinson, Dallas, GA (US)

(73) Assignee: Data:) Comm Electronics, Inc., Norcross, GA (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/355,553

(22) Filed: Feb. 16, 2006

(65) Prior Publication Data

US 2007/0187129 A1 Aug. 16, 2007

(51) Int. Cl.
*H02G 3/14* (2006.01)

(52) U.S. Cl. ............... 174/66; 174/67; 174/53; 220/241

(58) Field of Classification Search ............ 174/66, 174/67, 53, 58, 63, 64; 220/241, 242; 439/76.1; 631/119

See application file for complete search history.

(56) References Cited

U.S. PATENT DOCUMENTS

| | | | |
|---|---|---|---|
| D126,098 S | 3/1941 | MacIntosh | |
| D131,010 S | 1/1942 | Leslie | |
| D134,477 S | 12/1942 | Leslie | |
| 4,289,921 A * | 9/1981 | Gartner et al. | 174/488 |
| D261,924 S | 11/1981 | Donohue | D23/127 |
| 4,688,747 A | 8/1987 | Helmsdorfer et al. | 248/56 |
| D321,557 S | 11/1991 | Bezick et al. | D23/393 |
| 5,218,169 A * | 6/1993 | Riceman | 174/67 |
| 5,243,135 A * | 9/1993 | Shotey | 174/67 |
| D350,278 S | 9/1994 | Figueroa | D8/353 |
| D379,797 S | 6/1997 | Arnett | D13/156 |
| 5,664,955 A | 9/1997 | Arnett | 439/135 |
| 6,520,363 B1 * | 2/2003 | Sullivan | 220/3.8 |
| D503,156 S | 3/2005 | Provenzano | D13/156 |
| 7,022,915 B1 * | 4/2006 | Galguera | 174/66 |
| 7,271,339 B2 * | 9/2007 | Dinh | 174/66 |

OTHER PUBLICATIONS

Photograph of wall plate for communications cable, with protruding nose by Direct Connect of Houston, Texas.
Photograph of communications cable outlet nose with mounting bracket by Direct Connect of Houston, Texas.

* cited by examiner

*Primary Examiner*—Dhiru R Patel
(74) *Attorney, Agent, or Firm*—Thomas, Kayden, Horstemeyer & Risley, LLP

(57) ABSTRACT

A wall plate (10) is provided that accommodates communication cable and is formed by a support plate (11) and a cable support extension (12) mounted to the inner surface (20) support plate. The cable support extension is open-ended, with one opening in communication with the access opening (26) of the support plate (11) and the other opening projecting inside the wall structure (50). This allows the communication cable (56) to be fed from within the wall structure, through the wall plate, and beyond, with the cable support extension functioning as an interior sight barrier without obstructing the placement of a flat screen television set or other wall mounted objects.

16 Claims, 4 Drawing Sheets

WALL PLATE HAVING INTERNAL NOSE FOR ELECTRICAL CABLE

FIELD OF THE INVENTION

This invention concerns a wall plate that mounts about a hole in a wall structure, with the plate having an opening therein for the passage of communication cable of the type that is to connect to a computer, television set, printer, or other communication device.

BACKGROUND OF THE INVENTION

When communications equipment such as computers, televisions and printers are to be placed in a room, it is desirable to have the communication cable(s) leading to the equipment to pass interiorly through the wall structure to a position adjacent the equipment and then through an opening in the wall structure to the equipment. A wall plate having a cable access opening may be mounted in the wall opening for extending the cable into the room and forming a neater look at the wall opening. This also provides a neater look in the room by avoiding the lengths of cable from being exposed in the room.

In the past, wall plates were simply flat plastic plates mountable to the wall about the hole in the wall, with an access hole in the wall plate passing the cable(s) into the room. This formed a more "finished look" to the cable entry. However, when the hole in the wall plate was not occupied by a cable, or when the cable occupied less than all the space of the access hole, a person could see through the access hole in the wall plate and possibly see into the wall structure.

Later, wall plates were developed that have a "nose" that protrudes from the wall plate into the room, with the nose having a downwardly facing opening that communicates with the access hole in the wall plate. The cable is extended from the access opening and through the nose into the room for connection to the computer. This type of wall plate having a nose-shield has met with popular use since the nose-shield provides a visual barrier through the opening in the wall plate.

More recently, electrical appliances, particularly flat screen televisions, are mounted directly to the wall, so that the protruding nose of a wall plate interferes with mounting the television in flat abutment with the surface of the wall. The wall plate can be displaced laterally or vertically with respect to the flat screen television with the opening of the nose of the wall plate directed toward the television so as to provide the least exposure of the cable. However, this arrangement does not hide the wall plate and a short run of the cable leading to the television set, and is usually considered visually obnoxious.

It is to the above described matters that this invention is directed.

SUMMARY OF THE INVENTION

Briefly described, this disclosure concerns a wall plate for mounting about a wall opening in a wall structure. The wall plate has an access opening for passing of an electrical cable from inside the wall structure through the wall opening to the outside of the wall structure, for connection to an electrical appliance, such as to a flat screen television.

The wall plate includes a flat support plate having an inner surface for mounting against the wall about the wall opening. An access opening is formed in the support plate for alignment with the wall opening, and a cable support extension or "nose" is mounted to the inner surface of the support plate for extending from the wall plate and through the wall opening into the wall structure. The cable support extension has an internal sloped wall that is sloped with respect to the wall plate and that defines a cable passage oriented at an angle with respect to the support plate that is in registration with the access opening. The cable support extension extends into the wall structure so that an electrical cable can extend from within the wall structure, through the access opening and through the cable support extension, and the cable support extension forms a sight barrier from outside the wall structure through the access opening.

The support plate is flat and formed so as to be substantially coextensive with the wall to which it is to be mounted, such that substantially no protrusion extends from the outer surface of the support plate into the room. This enables objects such as a flat screen television to be mounted substantially flush with the vertical wall surface.

Preferably, the cable support extension or "nose" extends a distance between 2 and 3½ inches from the support plate in a direction laterally from the support plate, for projecting into the wall structure. Since most wall structures are formed with wall board of less than one inch thickness that are mounted to vertical studs that are 3¾ inches wide, the relatively large cable support extension of the wall plate can be accommodated by the typical wall structure.

Preferably, the cable support extension includes, in cross section, a U-shaped wall including opposed side wall segments mounted at the side edges of the support plate access opening and a distal wall segment mounted at one of the end edges of the support plate access opening and joined to the side wall segments and sloped away from the inner surface of the support plate. This U-shaped wall or "nose" defines open ends, with one end in communication with the access opening of the support plate and the opposed inner opening extending into the interior of the wall structure.

When the wall plate is located in a position low in a wall structure, the inner opening of the sloped cable support extension faces upwardly, so that the line of sight for the typical person standing or sitting in the room does not see the inner opening of the cable support extension. Likewise, if the wall plate is to be placed high on the wall, the wall plate can be inverted so that its inner opening faces downwardly so that a person standing or sitting in the room does not see the inner opening of the cable support extension. Thus, the cable support extension forms an interior sight barrier when the wall plate is exposed to view, but the wall plate does not have an extension that projects into the room. When the wall plate is to be placed behind a flat screen television or other wall mounted object, the cable support extension does not protrude outwardly of the support plate and, therefore, does not interfere with placement of the flat screen television, etc. on the wall.

Thus, it is an object of this invention to provide an improved wall plate for mounting about a wall opening of a wall structure for the passage of communication cable, with the wall plate being shaped and positioned so as to avoid interference with the mounting of objects directly to the wall at the position of the wall plate and to provide an interior sight barrier to avoid viewing through the opening in the wall.

Other objects, features and advantages of the present invention will become apparent upon reading the following specification, when taken in conjunction with the accompanying drawings.

DETAILED DESCRIPTION

Figure 1:
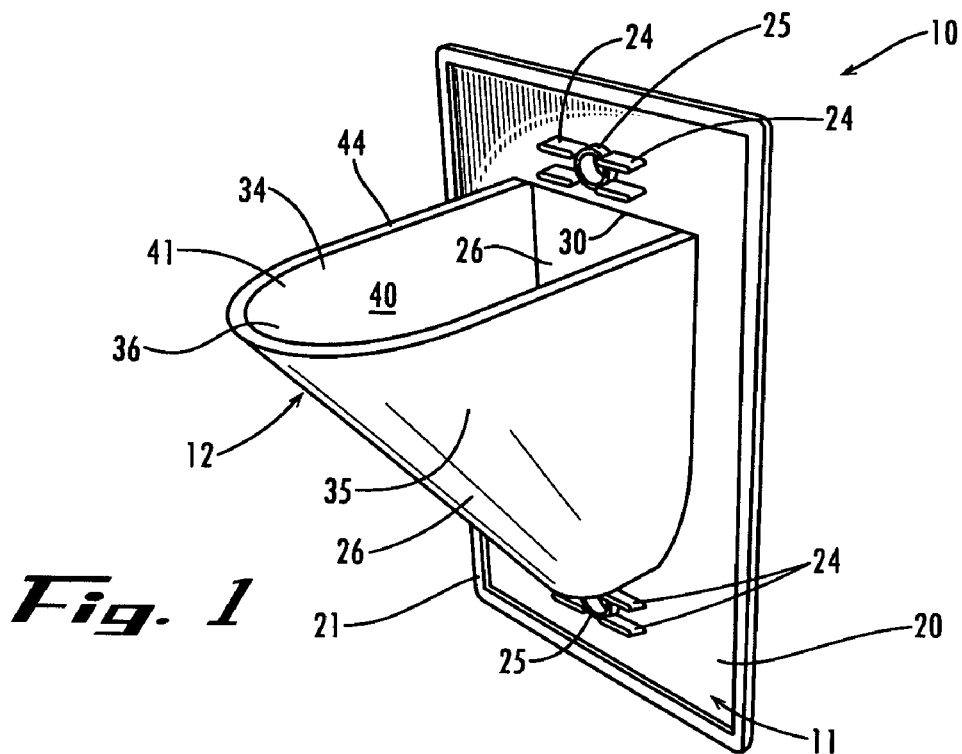
FIG. 1 is a perspective view of the wall plate, showing the inner surface of the support plate and the cable support extension or "nose" protruding therefrom.

Referring now in more detail to the drawings, in which like numerals indicate like parts throughout the several views, FIG. 1 illustrates a wall plate 10 having a support plate 11 and a cable support extension or "nose" 12 mounted to the support plate.

The support plate is rectangular, including opposed side edges 14 and 15 and opposed top and bottom edges 16 and 17. The outer surface 19 of the support plate 10 is substantially flat, and the side and top edges 14-17 are rounded so as to extend toward the wall on which it is to be mounted.

The inner surface 20 of the support plate is substantially flat with a protruding perimeter flange 21 extending thereabout. Small stand off protrusions 24 are formed on the inner surface 20, spaced from the inner perimeter flange 21 for bearing against an adjacent surface, such as the wall surface or frame to which the wall plate is to be mounted. Screw openings 25 are formed among the stand off protrusions 24 for receiving connector screws that mount the wall plate to the wall.

Figure 2:
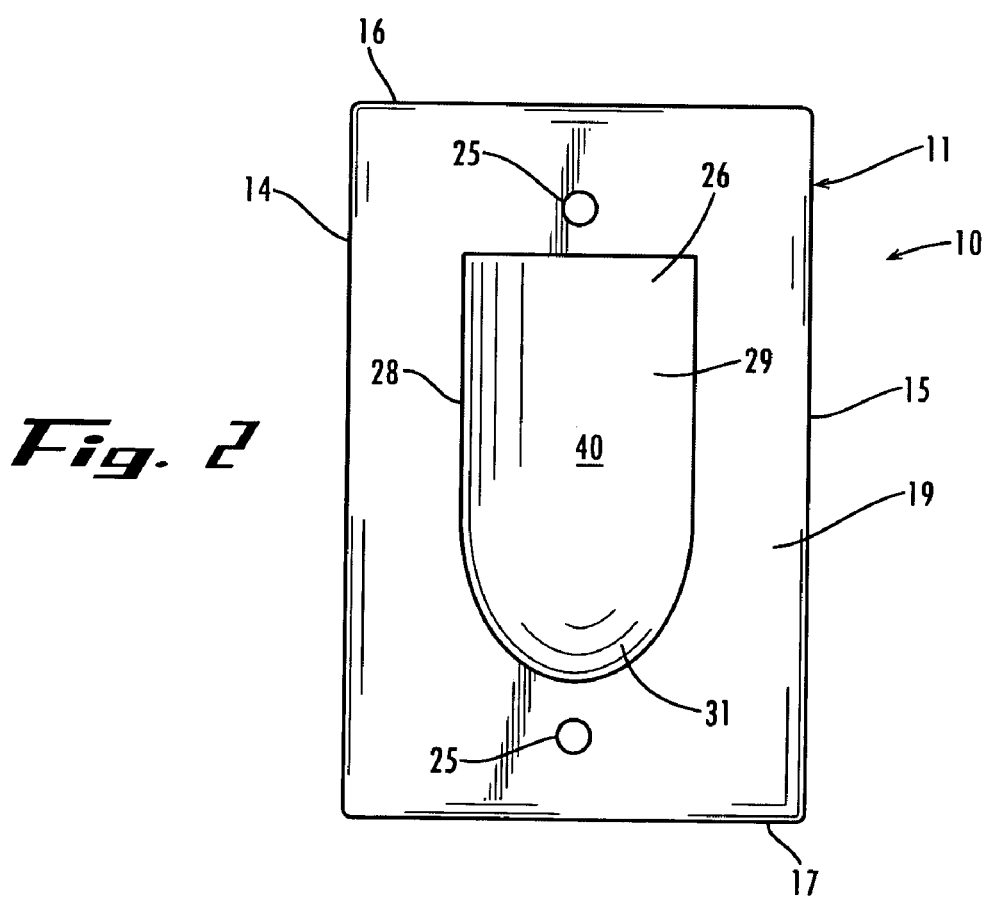
FIG. 2 is a front elevational view of the wall plate of FIG. 1, showing the access opening of the support plate and the cable support extension through the access opening.
Figure 3:
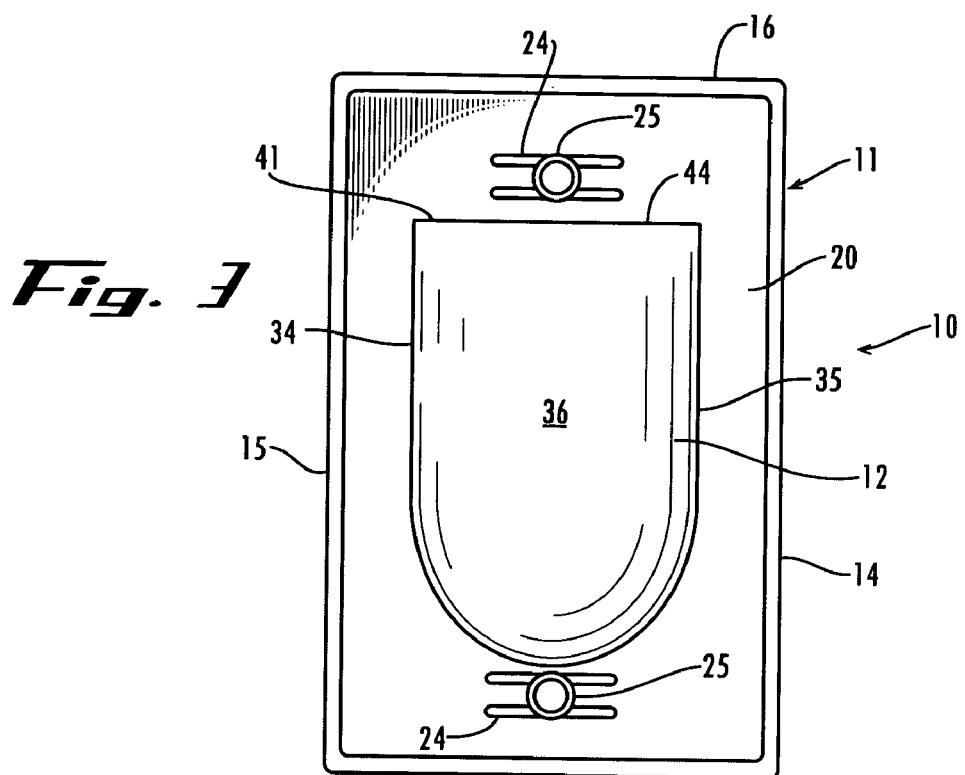
FIG. 3 is a back elevational view of the wall plate of FIGS. 1 and 2.

A support plate access opening 26 is formed centrally in the support plate 11 for the passage therethrough of communication cable, etc. The access opening includes opposed side edges 28 and 29, and opposed end edges 30 and 31. Optionally, the end edge 31 can be rounded as shown in FIG. 2.

Figure 4:
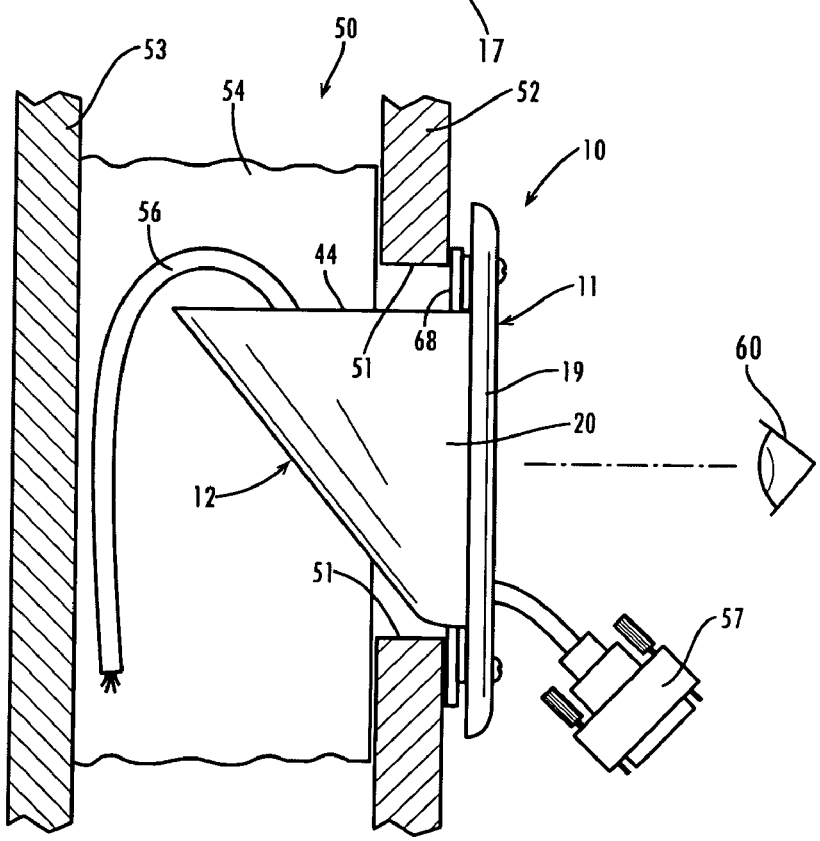
FIG. 4 is a side elevational view of the wall plate, showing how it is mounted to a wall structure and how a communication cable can be extended through the wall plate.

The cable support extension or "nose" is U-shaped in horizontal cross section and includes opposed side wall segments 34 and 35 mounted respectively at the side edges of the support plate opening and a distal wall segment 36 mounted at one of the end edges 31 of the support plate opening and joined to the side wall segments. The cable support extension formed by segments 34, 35, and 36 is open at its ends, forming a passage 40 therethrough. The cable support extension 12 is sloped with respect to the support plate 11, with the curved distal wall segment 36 extending at an angle of between 35° and 45° with respect to the support plate 11, so that its inner opening 41 is of significant breadth to protrude inwardly of the wall structure, as shown in FIG. 4. The passage 40 is in full registration with the support plate access opening 26.

Figure 5:
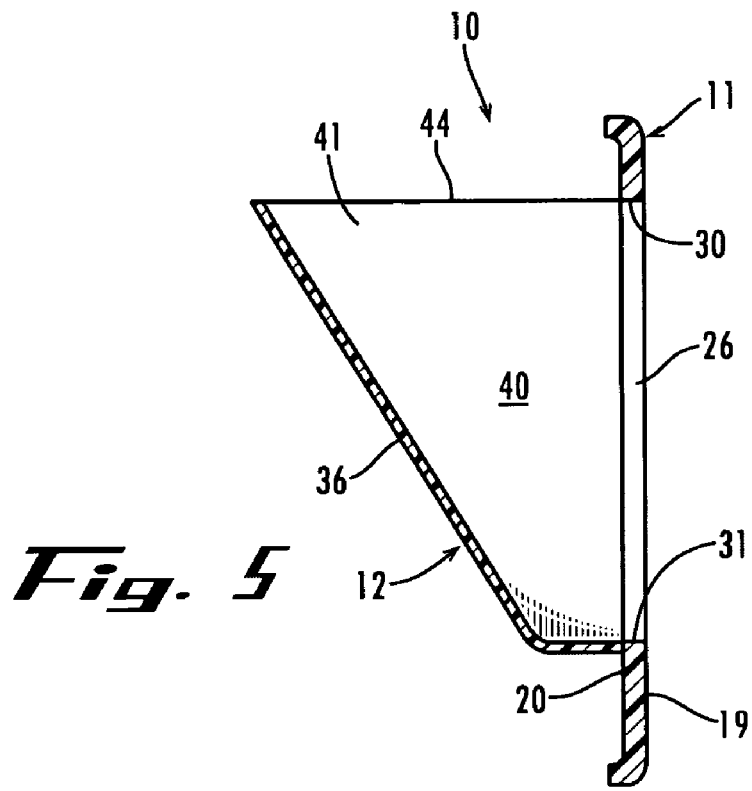
FIG. 5 is a side elevational view of the wall plate, shown in cross section.
Figure 6:
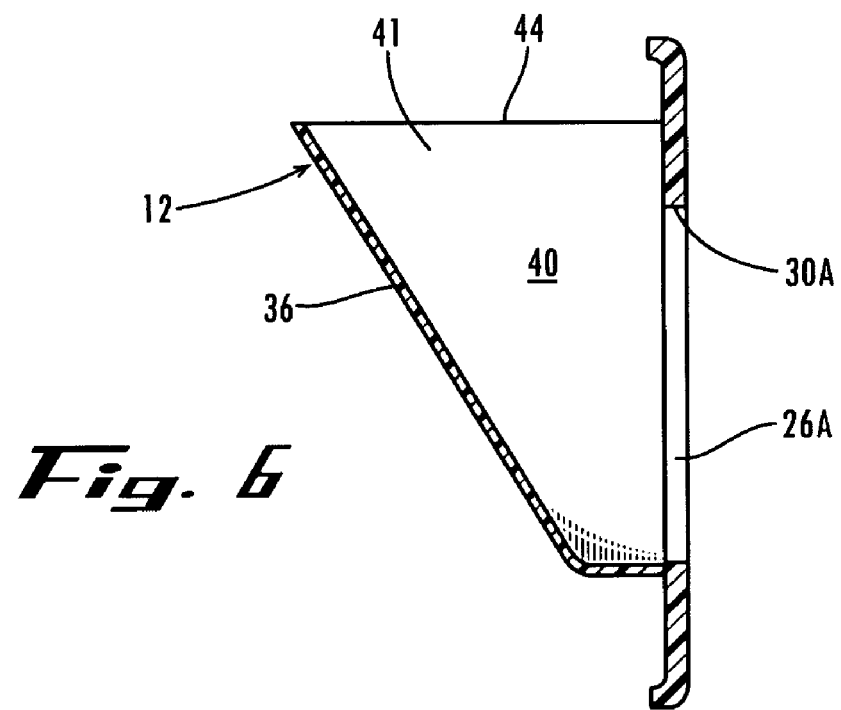
FIG. 6 is a side elevational view, in cross section, of a modified form of the wall plate.

As shown in FIGS. 1 and 5, the edge 44 about the inner opening 41 of passage 40 of the of cable support extension 12 is substantially coextensive with the end edge 30 of the access opening 26 of support plate 11. However, FIG. 6 shows that the end edge 30A may be formed so that it projects farther into the access opening 26, so that the edge 30A protrudes down into the cable support extension 12. Thus, the edge 30A defines a support plate access opening 26A that is of smaller breadth than the height of the cable support extension 12, and the extended edge 30A forms a deeper sight barrier with respect to viewing through the cable support extension.

As illustrated in FIG. 4, when the wall plate 10 is to be mounted in a wall structure 50 an opening 51 is formed in the wall board 52 for receiving the cable support extension 12. Typically, the wall structure 50 will be formed by vertical studs of 2×4's, that form a depth between the wall boards 52 and 53 of 3¾ inches. The vertical studs 54 form an internal space between the wall boards 52 and 53 where the communications cable may be drawn for connecting to a television, printer, etc.

The wall plate 10 is mounted in the opening 51 and the communications cable 56 is drawn from the interior of the wall structure and into the open-ended passage 40 of the nose of the wall plate and out through the support plate access opening 26 for connection to the communications device. A person standing with their eye level at 60 (FIG. 4) would not be able to see through the wall plate 10 into the interior 54 of the wall structure since the nose of the wall plate functions as an interior sight barrier. If the eye level 60 is lowered so that the person can see upwardly through the open-ended passage 40, then the wall plate 10 can be inverted to re-establish the sight barrier.

Figure 7:
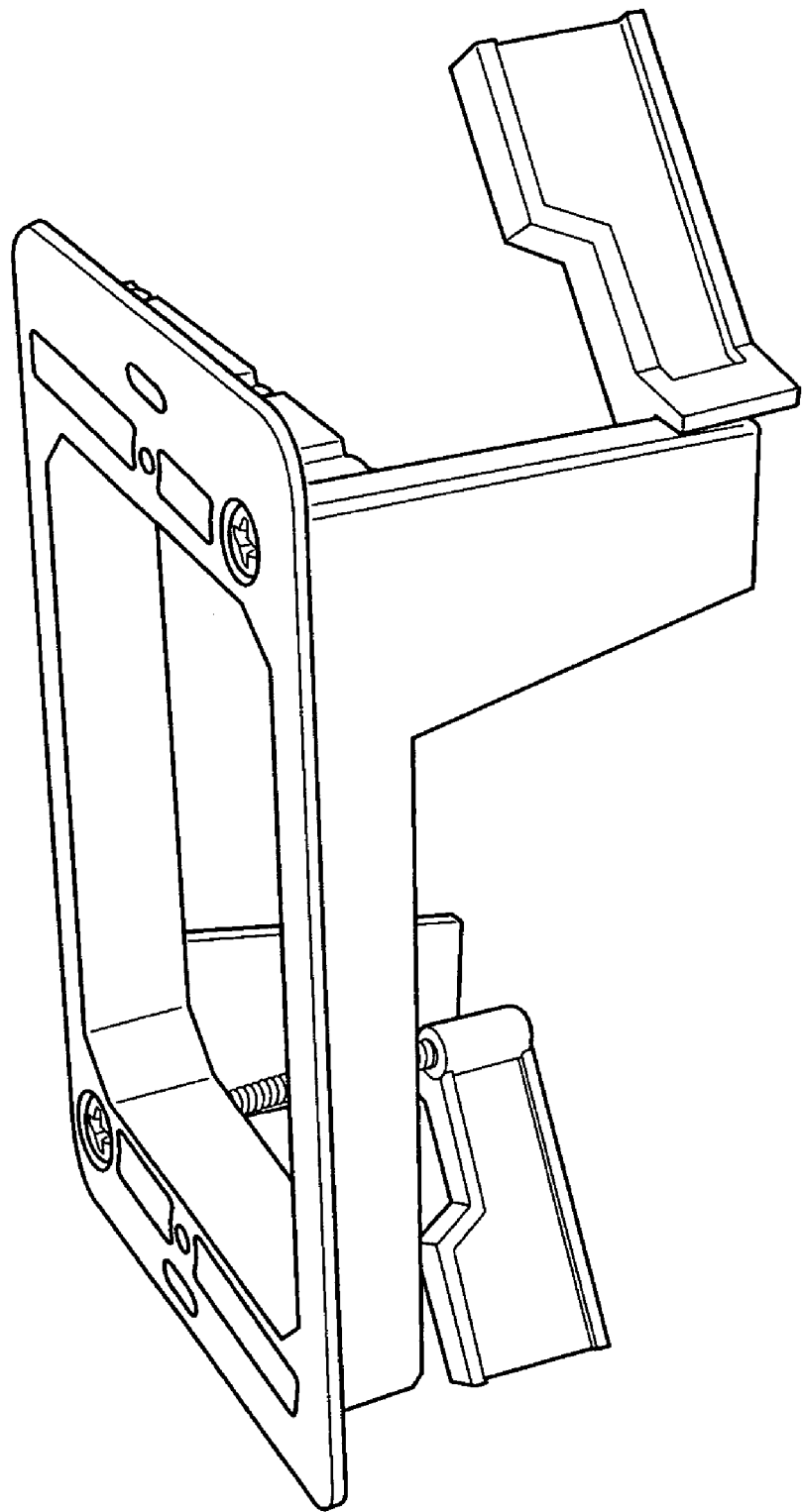
FIG. 7 is a perspective view of a support frame that may be used to support the wall plate in position in the wall opening.

Typically, the wall plate 10 will be mounted directly to a support frame 68 (FIG. 4), with the support frame in turn being connected to the wall board 52. This enhances the strength of the mounting of the wall plate to the wall structure. However, the wall plate is also of a strength and shape that it can be directly connected to the wall. A conventional support frame suitable for this purpose is shown in FIG. 7.

Since the communications cables 56 usually include an enlarged plug, such as plug 57 of FIG. 4 that is up to 2 inches wide and up to one inch thick, it is desirable to have the internal, open-ended passage 40 of the cable support extension or "nose" 12 be formed with width and thickness that correspond. The passage 40 may therefore be relatively thin in its width at 1 and ¼ inches and deeper at 2¼ inches, as shown in FIGS. 1 and 2. The relative thin dimension tends to limit the slanted view through the passage 40.

Although preferred embodiments of the invention have been disclosed in detail herein, it will be obvious to those skilled in the art that variations and modifications of the disclosed embodiments can be made without departing from the spirit and scope of the invention as set forth in the following claims.

We claim:

1. A wall plate for mounting about a wall opening of a wall in a wall structure for passing of an electrical cable from inside the wall structure through the wall opening to outside the wall structure, the wall plate comprising:

a support plate having an inner surface for mounting against the wall and about the wall opening, a support plate opening formed in the support plate for alignment with the wall opening, the support plate opening having opposed side edges and opposed end edges, a cable support extension mounted to the inner surface of the support plate at the support plate opening and forming a cable passage extending from the inner surface of the support wall plate for projecting through and beyond the wall opening and into the wall structure, the cable support extension having a wall sloped with respect to the wall plate and that defines the cable passage oriented at an angle with respect to the support plate in registration with the support plate opening, such that the cable support extension extends through the wall opening and into the wall structure so that an electrical cable can extend from within the wall structure through the cable support extension and through the support plate opening and the cable support extension forms a sight barrier on the inner surface of the support plate when viewing from outside the wall structure through the wall opening for blocking the view of the inside of the wall structure.

2. The wall plate of claim 1, wherein the support plate has an outer surface that is flat and formed to be substantially co-extensive with the wall to which it is to be mounted such that no protrusion extends from the outer surface of the support plate that would obstruct the mounting of a communications device in abutment with the wall plate.

3. The wall plate of claim 1, wherein the cable support extension is open ended and includes an inner opening oriented substantially perpendicular to the support plate.

4. The wall plate of claim 1, wherein the cable passage of the cable support extension at the support plate has a breadth that is greater than the size of the opening of the support plate opening.

5. The wall plate of claim 1, wherein the cable support extension has an inner end for extending into the wall structure that forms an opening of the cable passage, and the inner end of the cable support extension extends between two inches and three and one half inches in a direction laterally from the support plate.

6. The wall plate of claim 1, wherein the cable support extension includes:
   a U-shaped wall including opposed side wall segments mounted at the side edges of the support plate opening and a distal wall segment mounted at one of the end edges of the support plate opening and joined to the side wall segments and sloped away from the inner surface of the support plate,
   the U-shaped wall defining a cable opening at the other end edge of the support plate opening and a cable passage from the cable opening to the support plate opening and through the wall plate.

7. A wall plate for mounting about a wall opening of a wall in a wall structure for passing an electrical cable from inside the wall structure through the wall opening to outside the wall structure comprising: a support plate having an inner surface for mounting against the wall and about the opening in the wall, a support plate opening formed in the support plate for alignment with the wall opening, a cable support extension mounted to the support plate and forming a cable passage sloped with respect to the inner surface of the support plate and extending from the support plate and for projecting through and beyond the wall opening and sloped into the wall structure, and the cable support extension configured for forming an interior sight barrier on the inner surface of the support plate when viewing from outside the wall structure through the wall opening for blocking the view of the inside of the wall structure.

8. The wall plate of claim 7, wherein the cable support extension is U-shaped in cross section and is sloped with respect to the support plate and defines a cable entrance opening that is substantially perpendicular to the support plate.

9. The wall plate of claim 7, wherein the cable passage forms an entrance opening for receiving electrical cable at a position within the wall structure, wherein the breadth of the support plate opening is smaller than the breadth of the entrance opening of the cable passage.

10. The wall plate of claim 7, wherein the cable support extension has an inner end for extending into the wall structure that forms an inner opening of the cable passage, and the inner end of the cable support extension extends between two inches and three and one half inches in a direction laterally from the support plate and is sloped with respect to the support plate between 35 degrees and 45 degrees.

11. A wall plate for mounting about a wall opening of a wall in a wall structure for passing an electrical cable from inside the wall structure through the wall opening to outside the wall structure, said wall plate comprising:
   a support plate having an inner surface for mounting against the wall and about the opening in the wall, a support plate opening formed in the support plate for alignment with the wall opening, a cable support extension mounted to the support plate and forming a cable passage extending away from the inner surface of the support plate for projecting through and beyond the wall opening and into the wall and defining an inner opening for placement in the wall structure, the cable support extension configured for forming an interior sight barrier on the inside of the support plate when viewing from outside the wall structure through the support plate opening for blocking the view of the inside of the wall structure.

12. The wall plate of claim 11, wherein the inner end of the cable support extension extends between two inches and three and one half inches in a direction laterally from the support plate and is sloped with respect to the support plate between 35 degrees and 45 degrees.

13. The wall plate of claim 11, wherein the support plate has an outer surface that is flat and formed to be substantially co-extensive with the wall to which it is to be mounted.

14. The wall plate of claim 11, wherein the inner opening of the cable support extension is oriented transverse to the support plate and sized and shaped for passing a cable from inside the wall structure through the support plate opening to outside the wall structure.

15. The wall plate of claim 11, wherein the cable support extension is open-ended.

16. The wall plate of claim 12, wherein the cable support extension is open-ended, sloped with respect to the support plate, and includes a hump adjacent the support plate that displaces the sloped portion of the cable support from the support plate.

* * * * *